(12) United States Patent
de Jong et al.

(10) Patent No.: US 6,379,628 B2
(45) Date of Patent: Apr. 30, 2002

(54) PULSED ELECTRIC FIELD TREATMENT SYSTEM

(75) Inventors: Pieter de Jong, Ede; Egbertus Johannes Maria van Heesch, Eindhoven, both of (NL)

(73) Assignee: Nederlands Instituut voor Zuivelonderzoek (NL)

( * ) Notice: Subject to any disclaimer, the term of this patent is extended or adjusted under 35 U.S.C. 154(b) by 0 days.

(21) Appl. No.: 09/729,355

(22) Filed: Dec. 5, 2000

Related U.S. Application Data

(63) Continuation of application No. PCT/NL99/00347, filed on Jun. 5, 1999.

(51) Int. Cl.⁷ .................................................. B01J 19/08
(52) U.S. Cl. ...................... 422/186.04; 422/22; 99/451; 426/238
(58) Field of Search .............................. 422/186.04, 22; 99/451, 483; 210/243; 426/237, 238

(56) References Cited

U.S. PATENT DOCUMENTS

| | | | |
|---|---|---|---|
| 3,625,843 A | 12/1971 | Doevenspeck | 204/139 |
| 3,679,556 A | 7/1972 | Doevenspeck | 204/269 |
| 3,933,606 A | 1/1976 | Harms | 204/152 |
| 4,457,221 A | 7/1984 | Geren | 99/451 |
| 4,695,472 A | 9/1987 | Dunn et al. | 426/237 |
| 5,235,905 A | 8/1993 | Bushnell et al. | 99/451 |
| 5,690,978 A | 11/1997 | Yin et al. | 426/237 |

FOREIGN PATENT DOCUMENTS

FR 2 513 087 3/1983

*Primary Examiner*—Kishor Mayekar
(74) *Attorney, Agent, or Firm*—Pennie & Edmonds LLP

(57) ABSTRACT

The pulsating electric field (PEF) treatment system for preserving fluid products by means of a pulsating electric field comprises at least one electric supply source and at least one fluid flow path including at least one fluid treatment unit. The treatment unit comprises at least two electrodes which are each provided with a number of wires composed to form a net. Between the wires of the net fluid flow-through openings are formed. A surface stretched by the net is directed at least substantially perpendicularly to a fluid flow direction of the fluid flow path at the location of the net. The pulsating electric field is highly homogeneous.

20 Claims, 1 Drawing Sheet

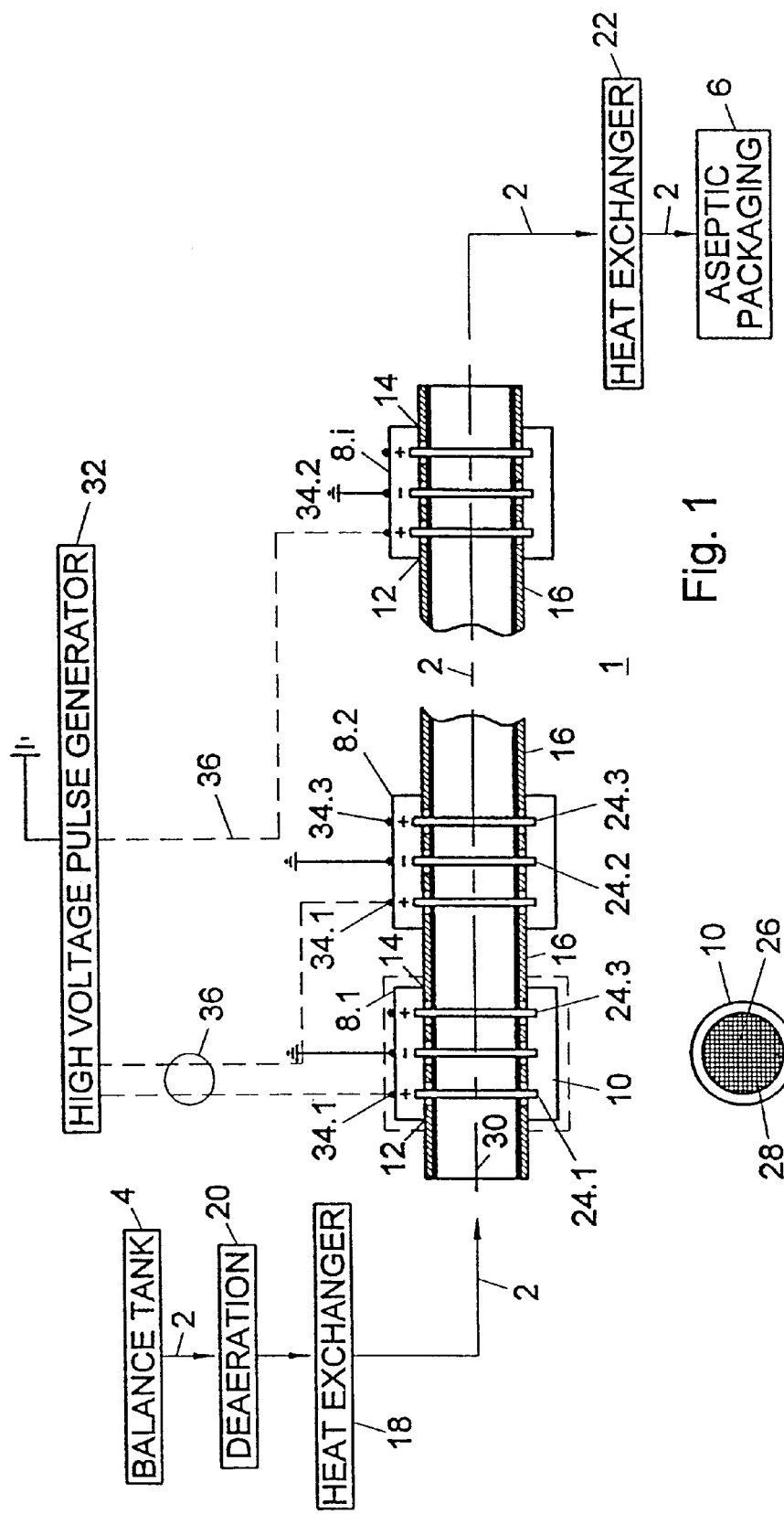

PULSED ELECTRIC FIELD TREATMENT SYSTEM

CROSS REFERENCE TO RELATED APPLICATIONS

This is a continuation of U.S. National Phase Designation of International Application PCT/NL99/00347 filed Jun. 5, 1999, the content of which is expressly incorporated by reference thereto.

BACKGROUND OF THE INVENTION

The invention relates to a pulsating electric field (PEF) treatment system for preserving fluid products by means of a pulsating electric field, comprising at least one electric supply source and at least one fluid flow path including at least one fluid treatment unit, which at least one fluid treatment unit comprises a fluid flow channel and at least two electrodes connected with the supply source for generating the pulsating electric field between the electrodes in the fluid flow channel, wherein the electrodes are included in the fluid flow channel and are each provided with a plurality of fluid flow through openings included in the fluid flow channel through which openings, in use, the fluid products flow.

The invention also relates to a treatment unit arranged for use in the system according to any one of the preceding claims, wherein the treatment unit comprises a fluid flow channel and at least two electrodes connected with the supply source for generating the pulsating electric field between the electrodes in the fluid flow channel, wherein the electrodes are included in the fluid flow channel and are each provided with a plurality of fluid flow-through openings included in the fluid flow channel, through which openings, in use, the fluid products flow.

Such a system and treatment unit is, inter alia, known from U.S. Pat. No. 3,933,606.

The preservation of food products is an important industrial and commercial activity which is mainly based on the inactivation or destruction of microorganisms in food products. The preservation of fluid food is initially based on the work of Louis Pasteur. In 1864 he developed a method for preventing extraordinary fermentation in wine by destroying the microorganisms responsible therefore by means of a heat treatment. To this day a heat treatment has been the most frequently used method for preserving fluid flood. The effect of the heat treatment on the quality of the end product depends on the duration and the temperature of the heat treatment. Apart from the fact that microorganisms are deactivated, the heat treatment also has negative side effects in a number of cases. In an attempt to minimize these negative side effects, the industry has concentrated, inter alia, on treatment of short duration at a high temperature. To date, however, attempts to use a heat treatment in which most of the microorganisms are deactivated without the occurrence of chemical or physical changes in the product have been unsuccessful.

In reaction thereto systems of the type defined in the opening paragraph have been developed. In these systems pulsating electric fields of very high intensity are generated in the fluid products to be preserved. The expectation was that the food subjected to such a treatment remains "fresh" and has a long shelf life. Besides, it appears that the method does not have the above-mentioned negative side effects.

According to the present insights it is a fact that in the pulsating electric field treatment system the activity of bacteria and other microorganisms is reduced because the cell structure of the bacteria and the microorganisms is damaged by the pulsating electric field. This electric field generates an electric potential over the membrane of a living cell. This electric potential causes an electric charge difference in the cell membrane. When this electric potential exceeds a specific threshold value, pores are formed in the cell membrane. When this threshold value is largely exceeded, more pores are formed, while, moreover, the thickness of the cell membrane decreases. This implies that the cell is destroyed.

In the known system according to U.S. Pat. No. 3,933,606 the electrodes each consist of a plate having a plurality of flow-through openings. This is therefore a system for a continuous treatment of fluid products.

A problem in the known apparatus is, however, that an undesirable inhomogeneous electric field and/or a disturbance of the fluid flow pattern occurs in the fluid flow channel. This has the result that the fluid product is irregularly treated. Besides, it appears that a relatively large energy supply to the electrodes is necessary for destroying the microorganisms. This implies, however, that during the treatment the temperatures of the product to be treated can rise to such a value that the above-mentioned negative effects begin to occur in a heat treatment. Moreover, it appears that only a small percentage of the microorganisms to be destroyed is actually destroyed. Another problem of the known apparatus is that this apparatus is not suitable for industrial use. One example of an industrial use is a flow rate exceeding 1,000 liters per hour.

Moreover, attempts to increase the effectiveness of the known treatment system by further increasing the intensity of the electric field involve the risk of electric breakdown. It is also possible that the originally neutral molecules are ionized and that the liquid begins to evaporate locally. It is an object of the invention to provide a solution for the above-mentioned problems.

SUMMARY OF THE INVENTION

The present invention provides a treatment system which applies a pulsating electric field to fluid products traveling along a fluid flow path. The system includes at least one electric supply source and at least one fluid treatment unit that has at least two electrodes connected with the supply source for generating a pulsed electric field between the electrodes in a fluid flow channel that is disposed in the fluid flow path. The invention is characterized in that the electrodes are each provided with a number of wires composed to form a net, with the fluid flow-through openings being formed between the wires of the net.

The specific design of the fluid treatment unit of the treatment system results in a homogeneous electric field being generated. Moreover, the homogeneous electric field has practically no influence on the flow pattern, so that the residence time distribution of the fluid products in the fluid treatment unit is uniform. It further appears that 30% less energy supply to the electrode is required than in the known system. This, in turn, has the result that the above-mentioned disadvantageous thermal effects do not occur. It is also possible that the system according to the invention is used with fluid flows exceeding 1,000 liters per hour. Since in the system according to the invention high electric field intensities are possible with an energy supply the amount of which is comparable to the amount of the energy supply of conventional systems, this implies that a higher percentage of the microorganisms to be deactivated is actually deactivated.

Preferably, the at least one treatment unit comprises a tube made of an insulating material, provided with a flow-in opening and a flow-out opening, the electrodes being included in the tube and the surface stretched by the net of each of the electrodes being directed at least substantially perpendicularly to an axial axis of the tube at the location of the relevant net.

The at least one treatment unit particularly comprises 2–20 electrodes spaces apart in the fluid flow direction. Between each pair of adjacent electrodes a pulsating electric field can be generated.

The system particularly comprises 1–20 treatment units included in the at least one fluid flow path. These treatment units are preferably connected in series.

The treatment unit suitable for use in the system according to the invention is characterized in that the electrodes are each provided with a number of wires composed to form a net, with the fluid flow-through openings being formed between the wires of the net.

FR-A-25 13 087 discloses a treatment system for treatment of fruit pulp wherein the electrode consists of a mesh. However, the fruit pulp flows in a direction perpendicular to the generated electric field between the electrodes.

BRIEF DESCRIPTION OF THE DRAWINGS

The invention will now be further explained with reference to the drawings in which:

FIG. 1 diagrammatically shows a possible embodiment of a pulsating electric field (PEF) treatment system according to the invention; and FIG. 2 shows a cross-section of the fluid treatment unit of the system shown in FIG. 1.

DETAILED DESCRIPTION OF THE PREFERRED EMBODIMENTS

In FIG. 1 reference numeral 1 denotes a pulsating electric field (PEF) treatment system according to the invention for preserving fluid products by means of a pulsating electric field according to a continuous process. The system comprises a fluid flow path 2 along which the fluid products to be preserved can be passed. The fluid flow path 2 extends between a storage tank 4 and an aseptic packaging apparatus 6.

The system comprises n fluid treatment units $8.i$ included in the fluid flow path. The fluid treatment units $8.i$ are connected in series. In this example each fluid treatment unit $8.i$ comprises a fluid flow channel 10 formed by a tube 10 made of an insulating material. The tube 10 is provided with a flow-in opening 12 and a flow-out opening 14. The flow-out opening of the fluid treatment unit $8.i$ is connected via a tubular coupling piece 16 with the flow-in opening of the fluid treatment unit $8.i+1$ (i=1, 2, . . . , n−1). The tubular coupling piece may be made of a conductive as well as a non-conductive material. This implies that the fluid treatment units $8.i$ and the tubular coupling pieces 16 in combination form a part of the fluid flow path along which the fluid to be treated is transported.

The apparatus further comprises a first heat exchanger 18 included in the fluid flow path 2 upstream of the fluid treatment unit $8.i$. Furthermore, the apparatus comprises a deaeration unit 20 included in the fluid flow path 2 between the storage tank 4 and the first heat exchanger 18. Besides, the system further comprises a second heat exchanger 22 included in the fluid flow path 2 between the fluid treatment unit $8.n$ and the packaging apparatus 6.

In this example each fluid treatment unit $8.i$ comprises at least two electrodes $24.j$ (j=1, 2, . . . , m, m≧2) included in the tube 10, that is to say in the fluid flow channel 10. In this example each fluid treatment unit $8.i$ comprises three electrodes 24.1, 24.2 and 24.3. The electrodes are each provided with a number of wires composed to form a net 26. Between the wires of the net 26 fluid flow-through openings 28 are formed. The surface stretched by the net 26 is directed at least substantially perpendicularly to a fluid flow direction in the fluid flow channel 10 at the location of the net. In this example the above surface is directed perpendicularly to an axial axis 30 of the tube 10 of the relevant fluid treatment unit $8.i$.

It therefore applies that the electrodes each comprise a plurality of fluid flow-through openings which are included in the fluid flow channel and through which, in use, the fluid products flow.

As shown in FIG. 2, the net is formed by a large number of wires crossing each other perpendicularly, which wires at least substantially lie in a flat plane. The flat plane is, as stated, directed perpendicularly to the axial axis 30. This implies that the fluid flow-through openings 28 are square. It is explicitly pointed out that other net forms are also possible. In this respect one example is chicken-wire-like constructions in which the fluid flow-through openings are hexagonal in cross-section. Other net structures, however, are also possible.

The system further comprises an electric supply source 32 for generating a pulsating electric tension.

The treatment units $8.i$ each comprise connecting contacts $34.j$ which are electroconductively connected with the electrodes $24.j$. In this example the connecting contacts $34.j$, that is to say the electrodes $24.j$, in which j has an even value, are connected with the supply source 32 via lines 36. Furthermore, the connecting contacts $34.j$, in which j has an even value, are connected to earth. The supply source 32 is also connected to earth. Via the lines 36 a potential difference is applied at each fluid treatment unit $8.i$ between the adjacent electrodes 24.1 and 24.2, on the one hand, and the adjacent electrodes 24.2 and 24.3, on the other hand.

This implies that at each fluid treatment unit a pulsating electric field is generated between the electrodes 24.1 and 24.2. Moreover, a pulsating electric field is generated between the electrodes 24.2 and 24.3. The generated electric field extends in the axial direction 30. Furthermore, it is a fact that the electric field is concerned with a homogeneous field intensity. That is to say that in any position between the electrodes $24.j$ the field intensity is at least substantially equally high.

The operation of the apparatus is as follows. The fluid products to be treated, in this example a fluid suitable for consumption such as milk and/or (polluted) water, is contained in the storage tank 1. The storage tank comprises a pump, not shown, which pumps fluid along the fluid flow path 2 to the packaging apparatus 6. From the storage tank 4 the fluid first flows to the deaeration apparatus 20. In the deaeration apparatus 20 gases and bubbles are removed from the fluid which might otherwise cause a disturbance in the pulsating electric field. From the deaeration apparatus 20 known per se the fluid flows to the first heat exchanger 18 in which the temperature of the product is adapted. In this example the fluid leaving the heat exchanger 18 has a temperature of, for instance, 25° C. From the heat exchanger 18 the fluid flows to the fluid treatment unit 8.1. In the fluid treatment unit 8.1 the fluid can flow without being disturbed through the fluid flow-through openings 28 of the electrodes 24.j. In the space within the tube 10 between the electrodes 24.j a pulsating electric field having a value of 60 kV/cm is generated by means of the supply source 32. The pulse width of the electric field is 2 µs. In this example the residence time in the treatment unit 8.1 is 0.2 S. In this example the distance between adjacent electrodes of the fluid treatment unit 8.1 is 5 mm. The pulse repetition frequency of the pulsating electric field is 40 Hz. The diameter of the flow-through openings 26 is 25 mm, while the diameter of the wires is 0.5 mm.

When the fluid thus flows through the fluid treatment unit 8.1, bacteria and microorganisms will be deactivated and/or killed under the influence of the pulsating electric field. The fluid then flows from the treatment apparatus 8.1 via the coupling piece 16 to the fluid treatment unit 8.2. In the fluid treatment unit 8.2 the fluid is subjected to a similar treatment as in the fluid treatment unit 8.1. In this example each of the fluid treatment units 8.i is dimensioned in a similar way and, moreover, a similar supply voltage is applied to the electrodes. In this example the system comprises ten series-connected treatment units 8.i (n=10). After the fluid has successively flown through each of the treatment units 8.i, the fluid is supplied to the second heat exchanger 22. The fluid supplied to the second heat exchanger 22 has a temperature of 25.5° C. When leaving the second heat exchanger, however, the fluid has a temperature of 5° C. Subsequently, the fluid is packaged in the packaging apparatus 6. It appears that in the fluid leaving the last fluid treatment unit 8.10 the number of bacteria and microorganisms has decreased by a factor of 100 as compared to the fluid contained in the storage tank 4.

The invention is in no way limited to the above-described embodiments. Thus the electric field may have a value of 10–100 kV/cm. The pulse width may vary from 0.05–500 microseconds. The distance between adjacent electrodes may, for instance, be 2–100 mm. In particular the number of electrodes in a treatment unit 8.i may vary from 2–20. The number of treatment units may also vary from, for instance, 1–20. The pulse repetition frequency of the electric field may, for instance, be 1–10,000 Hz. The residence time of the fluid in a treatment unit may be 0.1–300 sec. The diameter of the fluid flow-through openings 28 may be 0.1–30 mm, while the wire diameter may, for instance, vary from 0.05–5 mm. Such variants are each deemed to fall within the scope of the invention.

In this example the fluid treatment units 8.i are detachably connected with the rest of the system. The system is therefore of modular construction and can therefore be constructed by means of the fluid treatment units 8.i according to the invention in conformity with a desired situation. In this example the system comprises a fluid flow path, with the different fluid treatment units being connected in series. It is, however, also possible that the fluid flow path comprises a number of fluid treatment units which are connected in parallel. It is also conceivable that the system comprises fluid treatment units which are connected in parallel as well as in series. The different fluid treatment units of a system also need not be identical. Each individual fluid treatment unit 8.i may comprise its own specific value for the electric field, the pulse width, the distance between the electrodes, the number of electrodes, the pulse repetition time, the residence time, the diameter of the flow-through openings and the wire diameter. Moreover, different treatment units of the system may comprise differently formed net-shaped electrodes. In this respect electrodes with flow-through openings having square, hexagonal and/or other forms could be considered.

Such variants are all deemed to fall within the scope of the invention.

What is claimed is:

1. A pulsating electric field (PEF) treatment system for preserving fluid products by means of a pulsating electric field, comprising at least one electric supply source and at least one fluid flow path including at least one fluid treatment unit, wherein said at least one fluid treatment unit comprises a fluid flow channel and at least two electrodes connected with the supply source for generating the pulsating electric field between the electrodes in the fluid flow channel, wherein the electrodes are included in the fluid flow channel and are each provided with a plurality of fluid flow-through openings included in the fluid flow channel, through which openings, in use, the fluid products flow, characterized in that the electrodes are each provided with a number of wires composed to form a net, with the fluid flow-through openings being formed between the wires of the net.

2. A system according to claim 1, characterized in that a surface stretched by the net is directed at least substantially perpendicularly to a fluid flow direction in the fluid flow channel at the location of the net.

3. A system according to claim 1, characterized in that the diameter of the wires is 0.05–5 mm.

4. A system according to claim 1, characterized in that the wires are made of a conductive material.

5. A system according to claim 4, wherein the conductive material is one of a metal or a conductive plastic.

6. A system according to claim 1, characterized in that the at least one treatment unit comprises a tube made of an insulating material, provided with a flow-in opening and a flow-out opening, the electrodes being included in the tube and a surface stretched by the net of each of the electrodes being directed at least substantially perpendicularly to an axial axis of the tube at the location of that net.

7. A system according to claim 1, characterized in that the at least one treatment unit comprises connecting contacts which are electroconductively connected with the electrodes.

8. A system according to claim 1, characterized in that at least one treatment unit comprises 2–20 electrodes spaced apart in the fluid flow direction.

9. A system according to claim 1, characterized in that the distance between adjacent electrodes of the at least one treatment unit is 2–100 mm.

10. A system according to claim 1, characterized in that the fluid flow-through openings have a diameter of 0.1–30 mm.

11. A system according to claim 1, characterized in that the electric field generated by means of the at least one treatment has a value of 10–100 kV/cm.

12. A system according to claim 1, characterized in that the pulse width of the electric field generated by means of the at least one treatment unit is 0.05–500 µs.

13. A system according to claim 1, characterized in that the pulse repetition frequency of the electric field generated by means of the at least one treatment unit is 1–10,000 Hz.

14. A system according to claim 1, characterized in that, in use, the residence time of the fluid in the at least one treatment unit is 0.1–800 s.

15. A system according to claim 1, characterized in that the at least one fluid flow path includes 1–20 treatment units.

16. A system according to claim 15, characterized in that the treatment units are connected in series.

17. A system according to claim 1, characterized in that the system further comprises a deaeration apparatus which is included in the fluid flow path upstream of the at least one treatment unit.

18. A system according to claim 1, characterized in that the system further comprises at least one heat exchanger included in the fluid flow path.

19. A treatment unit for use in a pulsating electric field treatment system for preserving fluid products by means of a pulsating electric field, the treatment unit comprising:

a fluid flow channel and at least two electrodes connected with the supply source of generating the pulsating electric field between the electrodes in the fluid flow channel, wherein the electrodes are included in the fluid flow channel and are each provided with a plurality of fluid flow-through openings included in the fluid flow channel, through which openings, in use, the fluid products flow, characterized in that the electrodes are each provided with a number of wires composed to form a net, with the fluid flow-through openings being formed between the wires of the net.

20. A fluid treatment unit for preserving fluid products by means of a pulsating electric field, the fluid treatment unit comprising:

a tube defining a fluid flow channel;

a plurality of electrodes positioned in the fluid flow channel, each electrode comprising a number of wires arranged to form a net with fluid-flow openings defined between wires of the net, the fluid-flow openings being of sufficient size to permit flow of fluid products; and an electric supply source connected to each of the pluraltiy of electrodes and configured to generate a pulsating electric field within the fluid flow channel between the electrodes.

* * * * *